United States Patent
Suzuki et al.

(10) Patent No.: US 7,592,580 B2
(45) Date of Patent: Sep. 22, 2009

(54) OPTICAL AMPLIFIER AND GAIN CONTROL METHOD

(75) Inventors: Naoki Suzuki, Tokyo (JP); Junichi Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 458 days.

(21) Appl. No.: 10/591,872

(22) PCT Filed: May 26, 2004

(86) PCT No.: PCT/JP2004/007555

§ 371 (c)(1),
(2), (4) Date: Sep. 7, 2006

(87) PCT Pub. No.: WO2005/117215

PCT Pub. Date: Dec. 8, 2005

(65) Prior Publication Data

US 2007/0188853 A1    Aug. 16, 2007

(51) Int. Cl.
*H03F 3/08*     (2006.01)
*H03G 3/20*     (2006.01)

(52) U.S. Cl. ................ 250/214 A; 250/214 AG (58) Field of Classification Search ............ 250/214 A, 250/214 AG, 214 LA, 214 R, 214 C, 214.1, 250/227.11, 227.28; 327/513, 514; 330/59, 330/308
See application file for complete search history.

(56) References Cited

U.S. PATENT DOCUMENTS
2004/0057732 A1    3/2004    Usui et al.

FOREIGN PATENT DOCUMENTS

| EP | 1 085 683 A1 | 3/2001 |
|---|---|---|
| JP | 11-112434 A | 4/1999 |
| JP | 2000-68572 A | 3/2000 |
| JP | 2004-103861 A | 4/2004 |
| JP | 2004-186217 A | 7/2004 |

*Primary Examiner*—Que T Le
*Assistant Examiner*—Don Williams
(74) *Attorney, Agent, or Firm*—Birch, Stewart, Kolasch & Birch, LLP (57) ABSTRACT

An input monitoring unit monitors full input light and outputs an input monitor signal. An output monitoring unit monitors full output light and outputs an output monitor signal. An ASE compensating circuit compensates for an ASE component contained in the output monitor signal. A gain-variation-level compensating circuit calculates a target average setup gain that is determined based on a signal intensity of the input monitor signal. A constant gain control circuit performs a gain control based on an output signal from the ASE compensating circuit and the target average setup gain.

12 Claims, 11 Drawing Sheets

S101 — PROCESS OF CALCULATING TARGET SETUP GAIN ($G_M$) AT MAXIMUM INPUT INTENSITY

S201 — MEASURE $G(\lambda, P_{in\_max})$ AT MAXIMUM INPUT INTENSITY WITHIN INPUT DYNAMIC RANGE $$\begin{cases} G(\lambda_1, P_{in\_max}) \\ G(\lambda_2, P_{in\_max}) \\ \vdots \\ G(\lambda_n, P_{in\_max}) \end{cases}$$

S202 — CALCULATE AVERAGE ($G_M$) OF $G(\lambda)$
$G_M = \text{AVG}\{G(\lambda_1, P_{in\_max}), G(\lambda_2, P_{in\_max}), \ldots, G(\lambda_n, P_{in\_max})\}$

RETURN

OPTICAL AMPLIFIER AND GAIN CONTROL METHOD

TECHNICAL FIELD

The present invention relates to an optical amplifier and a gain control method, and more particularly, to an optical amplifier of which the gain control error is improved and a method of controlling the gain of the optical amplifier with an improved gain control error.

BACKGROUND ART

Generally, an optical amplifier that employs an optical fiber doped with a rare earth (hereinafter, "rare earth-doped fiber") as an amplification medium is used as an optical amplification repeater adopted in a WDM transmission system. This optical amplifier using the rare earth-doped fiber is an amplifier that can amplify all the optical signals in an amplification band at once as they are, and plays the role of an engine of stimulating the WDM technology because of its convenience and facilitation.

Meanwhile, for an optical amplifier used in the WDM transmission system, evenness in the amplification gain is required, with which the wavelength level of each signal light can be amplified in a substantially stable manner over the entire amplification band. With the above described optical amplifier, however, once the light intensity of an input signal input into the optical amplifier is changed due to a change in the signal wavelength, variation in the loss in the transmission channel, or the like, the gain profile of the optical amplifier changes, which results in throwing the optimum signal level diagram of the transmission system out of balance. This may reduce a ratio of signal to noise intensity (SNR). In addition, the quality of the transmission system affected by a non-linear transmission channel fiber may be significantly degraded.

Among techniques for suppressing the quality degradation of such a transmission system, a constant gain control technique of controlling the gain of an optical amplifier to stabilize, regardless of the input signal wave number (intensity), is disclosed (for example, Patent Document 1).

With the constant gain control technique disclosed in the Patent Document 1, in the process of detecting the gain of a forward-pumping optical amplifier using a rare earth-doped fiber from the input signal light intensity ($P_{in}$) and the output signal light intensity ($P_{out}$), $P_{ASE}$ is input as a constant ($\neq 0$) that corresponds to the light intensity of amplified spontaneous emission (ASE) caused in the rare earth-doped fiber, and ($P_{out}-P_{ASE}$)/$P_{in}$ is defined as the gain so that the power of the forward-pumping light is controlled to keep this gain constant. In other words, with the conventional optical amplification control technology, an error is compensated in the constant gain control, using the light intensity of spontaneous emission contained in the full output light of a light amplifier as a constant.

Patent Document 1

Japanese Patent Application Laid-open No. 11-112434 (p. 8, FIG. 1)

The above compensation technology (constant gain control technology), however, is based on the assumption that a rare earth-doped fiber has an ideal property of evenness, which prevents a gain profile variation component generated by the unevenness of the rare earth-doped fiber from being compensated. Thus, the gain profile variation caused in accordance with changes in the input signal light level, the number of wavelengths, and the wavelength results in a control error, creating a problem that the dynamic range of the input signal light, which is to maintain the evenness of the gain of the optical amplifier, is narrowed. There is also a problem that it is not applicable to certain types of rare earth-doped fibers in which a gain profile variation resulting from the unevenness is pronounced.

The present invention has been conceived in consideration of the above situation. The primary object of the present is to provide an optical amplifier that compensates a gain profile variation resulting from the unevenness of the optical amplifier. Then, the secondary purpose of the present invention is to disclose a gain control method for compensating a gain profile variation resulting from the unevenness of the optical amplifier and constitute the variable gain control method in a simple and accurate fashion.

DISCLOSURE OF INVENTION

An optical amplifier according to one aspect of the present invention employs a rare earth-doped fiber as an amplification medium and includes an input monitoring unit that monitors full input light and outputs an input monitor signal and an output monitoring unit that monitors full output light and outputs an output monitor signal. The optical amplifier includes an ASE compensating circuit that compensates for a spontaneous emission (ASE) component contained in the full output light monitor signal; a gain-variation-level compensating circuit that calculates a target average setup gain that is determined based on a signal intensity of the input monitor signal; and a constant gain control circuit that performs a gain control based on an output signal from the ASE compensating circuit and the target average setup gain from the gain-variation-level compensating circuit.

According to the present invention, the constant gain control of an optical amplifier that adopts a rare earth-doped fiber as an amplification medium is performed for different intensities of optically input signals, based on a signal for compensating the spontaneous emission (ASE) component contained in a full output light monitor signal and a target average setup gain determined in accordance with the signal intensity of the input monitor signal.

BEST MODE(S) FOR CARRYING OUT THE INVENTION

Exemplary embodiments of an optical amplifier and a gain control method according to the present invention will be explained in detail below with reference to the accompanying drawings. It should be noted that the present invention is not limited to these embodiments.

FIRST EMBODIMENT

Figure 1:
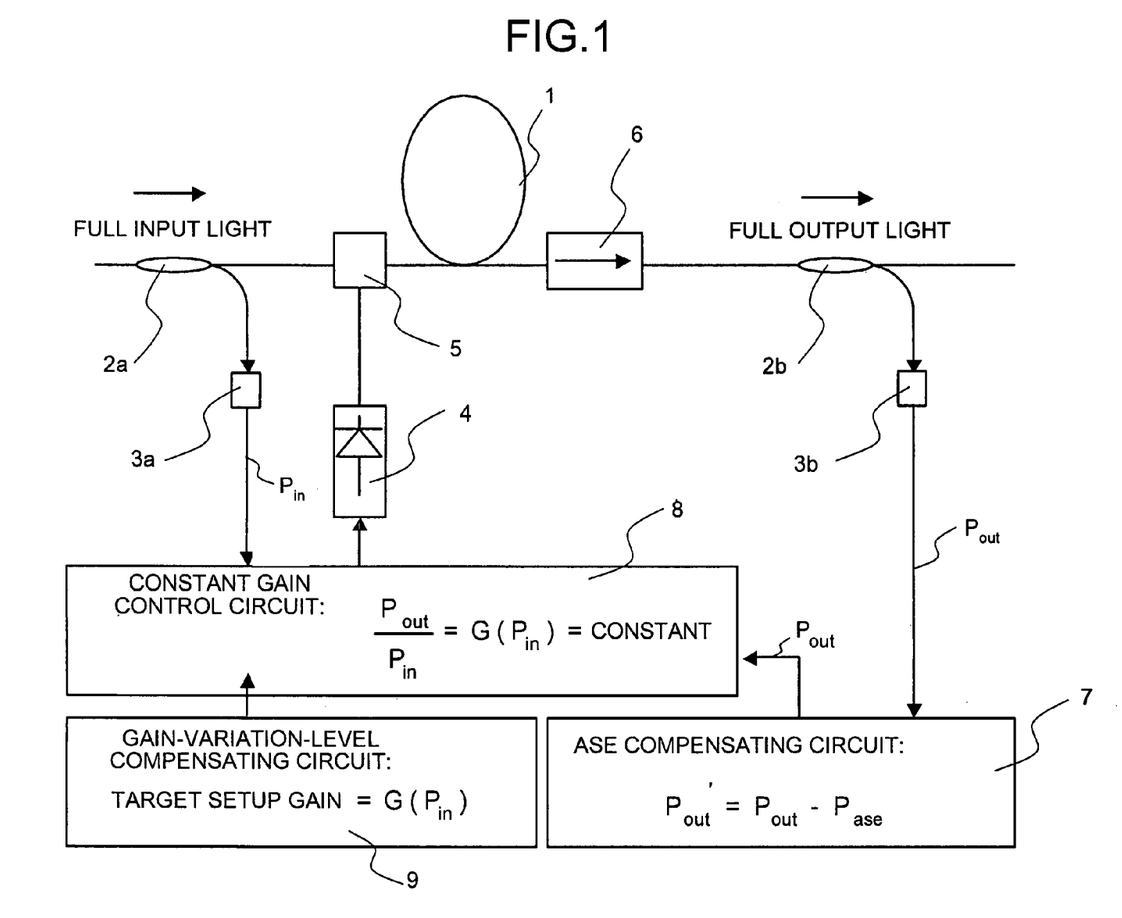
FIG. 1 is a functional structural diagram for explaining the gain control function of an optical amplifier according to a first embodiment of the present invention.

FIG. 1 is a functional structural diagram for explaining the gain control function of an optical amplifier according to a first embodiment of the present invention. In this drawing, a rare earth-doped fiber 1 is provided, to which forward-pumping light is input from a pumping-light source 4 by way of a pumping-light source coupler 5. On the other hand, an ASE compensating circuit 7, a constant gain control circuit 8, and a gain-variation-level compensating circuit 9 are provided as structural units that form the gain control function of the optical amplifier. The constant gain control circuit 8 is connected to an optical-level detecting unit 3a, which is connected to an optical coupler 2a provided at the input stage of the rare earth-doped fiber 1, the gain-variation-level compensating circuit 9, the ASE compensating circuit 7, and the pumping-light source 4. The constant gain control circuit 8 receives outputs from the optical-level detecting unit 3a, the gain-variation-level compensating circuit 9, and the ASE compensating circuit 7, and outputs a specific signal to the pumping-light source 4. In addition, the ASE compensating circuit 7 is connected to an optical-level detecting unit 3b, which is connected to an optical coupler 2b provided at the output stage of the rare earth-doped fiber 1, and receives an output from the optical-level detecting unit 3b.

The operation of the optical amplifier illustrated in FIG. 1 will be explained. In FIG. 1, part of the input signal light (the entire full input light) is diverged by the optical coupler 2a. The input signal light intensity is detected by the optical-level detecting unit 3a and converted to a full input light electrical signal of an electrical signal level $P_{in}$. On the other hand, the pumping light emitted from the pumping-light source 4 is input into the rare earth-doped fiber 1 by the pumping-light source coupler 5 along with the input signal light, where the input signal light is amplified. Part of the amplified output signal light (entire full output light) is diverged by the optical coupler 2b. The output signal light intensity is detected by the optical-level detecting unit 3b and converted to a full output light electrical signal of an electrical signal level $P_{out}$.

Further, the full input light electrical signal of the electrical signal level $P_{in}$ is input into the constant gain control circuit 8, while the full output light electrical signal of the electrical signal level $P_{out}$ is input into the ASE compensating circuit 7. The full output light electrical signal of the electrical signal level $P_{out}$ that is input into the ASE compensating circuit 7 is converted to satisfy $P_{out}' = P_{out} - P_{ase}$ by subtracting the ASE light electrical signal level $P_{ase}$ contained in the $P_{out}$. The pumping-light source 4 is feedback-controlled to bring the level ratio of the signals of the electrical signal levels $P_{in}$ and $P_{out}'$ that are input into the constant gain control circuit 8, defined as $P_{out}'/P_{in}$, to a target average setup gain $G(P_{in})$ that depends on the input signal intensity supplied by the gain-variation-level compensating circuit 9.

Through the above operation, an optical amplifier can be realized, in which the target average setup gain is set variably in accordance with the input signal level and used as a target average setup gain $G(P_{in})$ for stabilization control at a specific input signal light level. Unlike the controlling technique with which an error in the constant gain control is compensated using spontaneous emission intensity as a constant as in the conventional technology, the optical amplifier according to the present embodiment performs constant gain control in accordance with an input signal light level after compensating a spontaneous emission intensity component. This allows the gain profile variation resulting from the unevenness of the optical amplifier to be compensated.

As discussed above, the control method of the conventional technology that adopts the spontaneous emission intensity as a constant to compensate an error in the constant gain control cannot be applied to some types of rare earth-doped fibers in which the gain profile significantly varies owing to the unevenness. Next, the cause of such a problem will be explained.

On the assumption that a rare earth-dope fiber generally has an even property, propagation equations for the signal light intensity $I_s$ and the ASE light intensity $I_{ASE}$ in an amplification medium are expressed $$\frac{dI_s}{dz} = (\sigma_s N_2 - \sigma_a N_1) I_s \qquad (1)$$

$$\frac{dI_{ASE}}{dz} = (\sigma_s N_2 - \sigma_a N_1) I_{ASE} + 2h\nu\sigma_s N_2 \Delta\nu$$

where z is the position of an optical signal propagating through the amplification medium in the traveling direction, $N_2$ and $N_1$ are the densities at the upper level and lower level, respectively, with regard to the amplification levels, $s_s$ and $s_a$ are the stimulated emission cross-sectional area and the stimulated absorption cross-sectional area, respectively, of the amplification medium at the wavelengths of the signal light and the ASE light. Each of $\nu$ and $\Delta\nu$ represents the extensity of the center frequency of the ASE light. Further, the ± sign in the equations expressing the propagation of the ASE light represent the forward-direction ASE light and the reverse-direction ASE light, respectively.

As indicated in Equation (1), for $I_{ASE}$, a term $h\nu s_s N_2 \Delta\nu$ representing the spontaneous emission generated in such a manner as to be distributed in the optical amplifier is added to the term representing the amplification similar to $I_s$. This means that the gain of the amplifier is not determined independent from the output ASE light intensity and that the ASE light intensity cannot be dealt as a constant in accordance with the input signal level, even under a certain signal gain stabilization condition.

However, if the condition is such that the output ASE light intensity is barely dependent on the reverse distribution here, the output ASE light intensity can be dealt as a constant. In other words, the following equations can be obtained by solving Equations (1) on condition that the spontaneous emission generated in a distribution manner in the optical amplifier can be neglected.

$$Is(L) = Is(0)\exp\left[\int_0^L (\sigma_e N_2 - \sigma_a N_1) dz\right] \quad (2)$$

$$Iase(L) = Iase(0)\exp\left[\int_0^L (\sigma_e N_2 - \sigma_a N_1) dz\right]$$

where $I_s(L)$ and $I_{ase}(L)$ are the intensities at the output terminal of the rare earth-doped fiber.

It is considered that such approximation can hold by keeping the reverse distribution high on the signal light input side of the rare earth-doped fiber. This is because, if the gain is high in the vicinity of the input terminal of the signal light, most of the output ASE light intensity is occupied with components of the ASE light that is generated in the vicinity of the input terminal of the signal light and amplified while traveling through the rare earth-doped fiber. In an optical amplifier that satisfies such a condition, the ASE light intensity can be regarded as a constant as-long as the gain is constant. In such a case, the ASE light components contained in the full output light can be dealt as a constant and subtracted from the full output light, enabling the gain of the signal to be controlled and stabilized under a wide dynamic range.

However, Equations (2) are based on the assumption that the rare earth-doped fiber has a property of evenness. In actuality, even when the gain of the amplifier is constant, the signal gain still varies owing to changes in the input signal optical level, the wavelength number, and the wavelength that are caused by the unevenness of the rare earth-dope fiber. In other words, in an actual optical amplifier adopting a rare earth-doped fiber as an amplification medium, the signal power at the output terminal can be expressed as $$Is(L) = Is(0)\exp\left[\int_0^L (\sigma_e N_2 - \sigma_a N_1) dz\right] + \int_\lambda \Delta Is(Is, \lambda, L) d\lambda \quad (3)$$

The first term on the right side represents the output signal level based on the assumption that a property of evenness resides, while the second term represents a variation in the output level resulting from the unevenness of the rare earth-doped fiber, which is dependent on the input signal light level and the wavelength. As can be seen from Equation (3), even when the ASE light component staying at a constant level is compensable, a mismatch still appears in the gain corresponding to the second term, causing a control error in the constant gain control.

Figure 2:
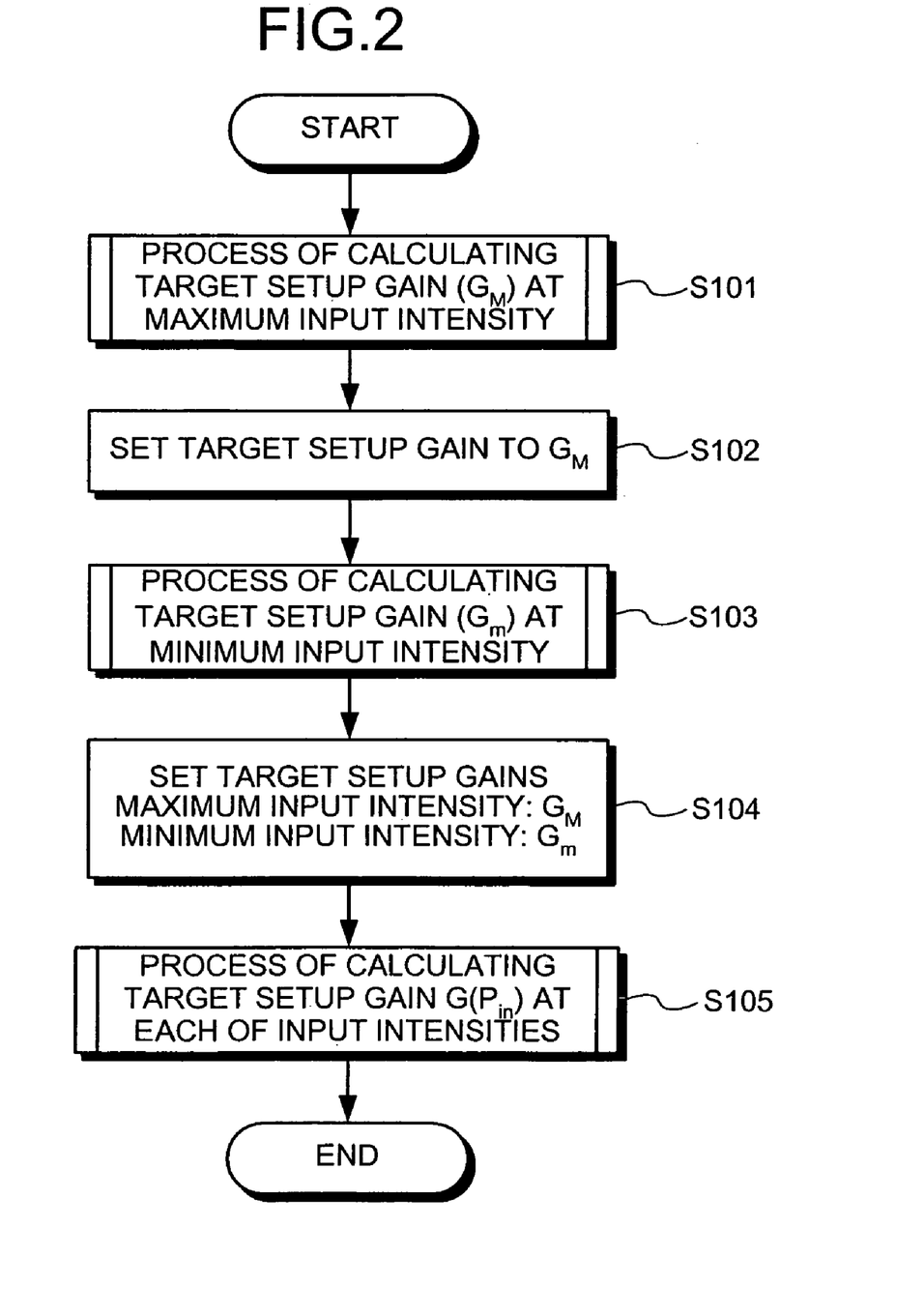
FIG. 2 is a flowchart of the procedure of setting a target average setup gain $G(P_{in})$ of a gain-variation-level compensating circuit 9.
Figure 3:
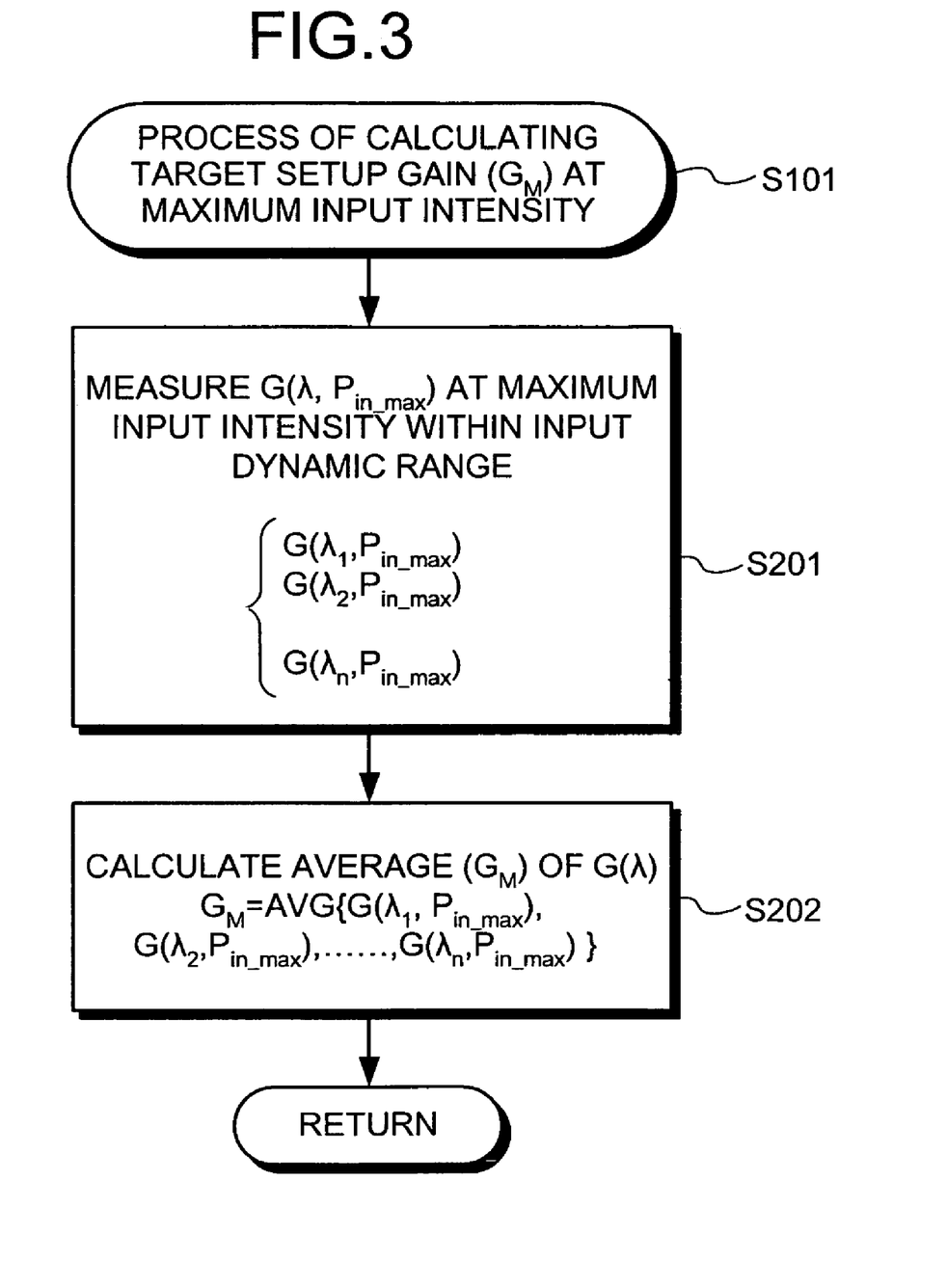
FIG. 3 is a flowchart of the process of calculating a target average setup gain ($G_M$) at the maximum input intensity in the setting procedure described in FIG. 2.
Figure 4:
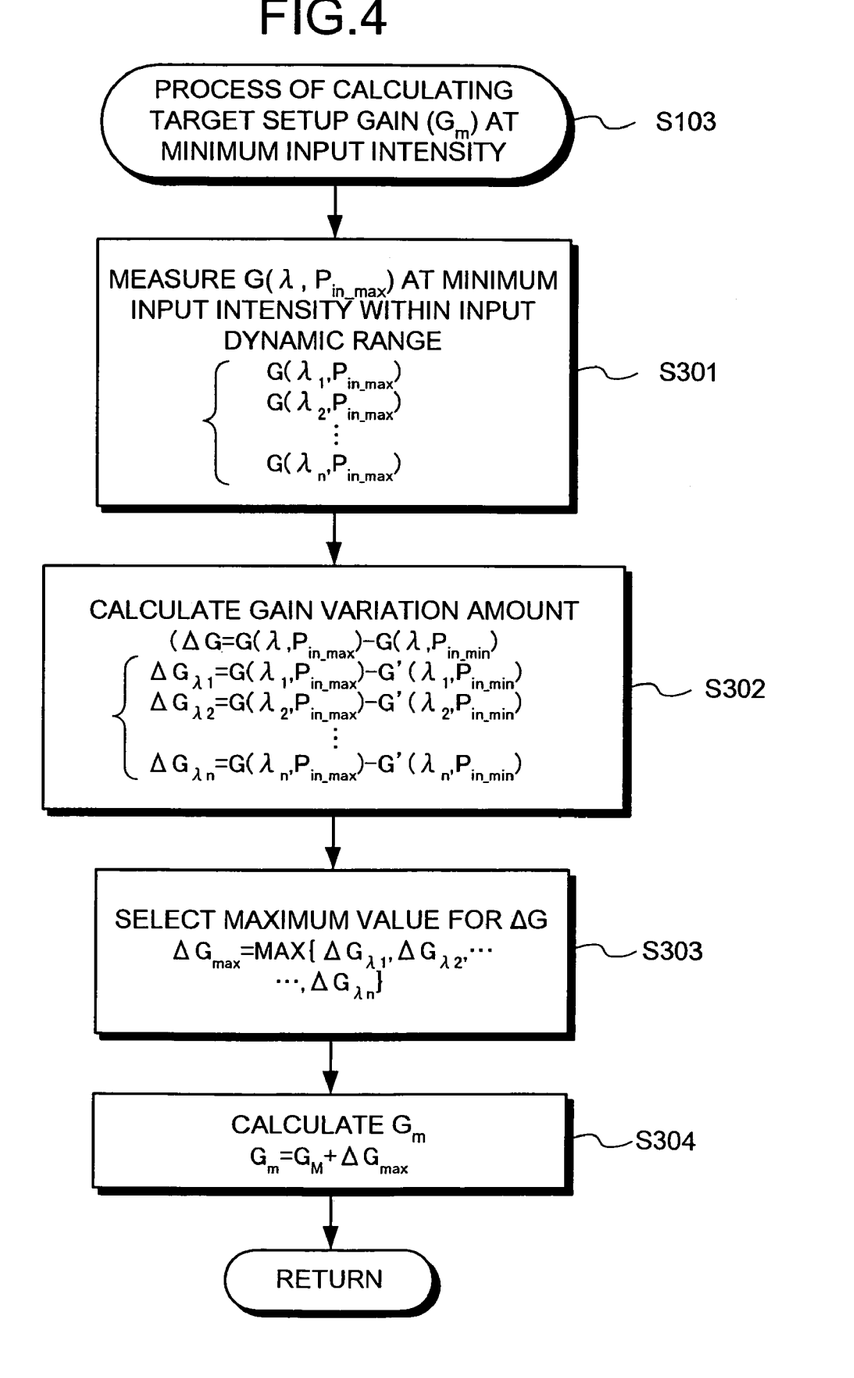
FIG. 4 is a flowchart of the process of calculating a target average setup gain ($G_m$) at the minimum input intensity in the setting procedure described in FIG. 2.
Figure 5:
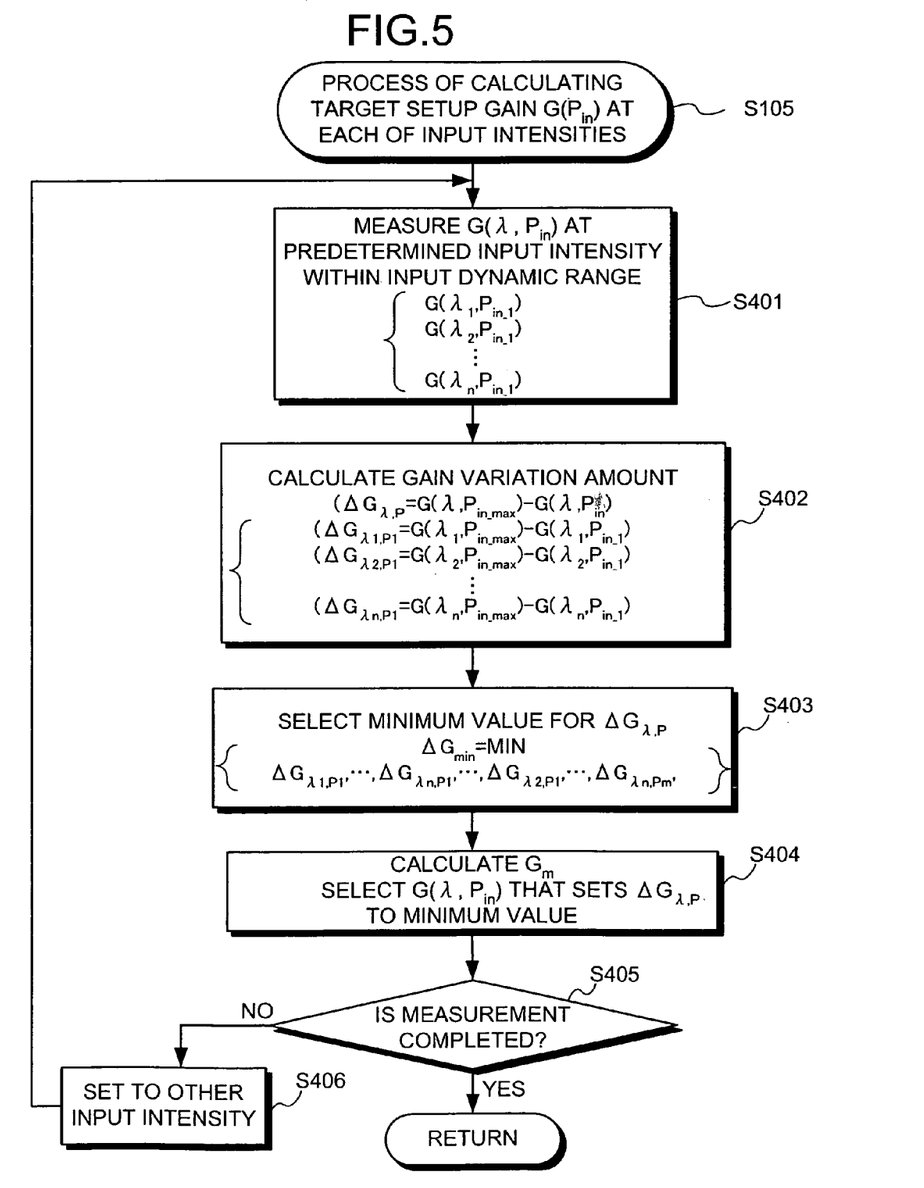
FIG. 5 is a flowchart of the process of calculating the target average setup gain ($G_{in}$) at different input intensities in the setting procedure described in FIG. 2.

The method of setting a target average setup gain $G(P_{in})$ for the gain-variation-level compensating circuit 9 will be explained with reference to FIGS. 2 to 5. FIG. 2 is a flowchart of the procedure of setting the target average setup gain $G(P_{in})$ of the gain-variation-level compensating circuit 9. FIG. 3 is a flowchart of the process of calculating a target average setup gain ($G_M$) at the maximum input intensity in the setting procedure described in FIG. 2, while FIG. 4 is a flowchart of the process of calculating a target average setup gain ($G_m$) at the minimum input intensity in the setting procedure described in FIG. 2. FIG. 5 is a flowchart of the process of calculating a target average setup gain ($G_{in}$) at different input intensities in the setting procedure described in FIG. 2.

First, the procedure of setting a target average setup gain $G(P_{in})$ described in FIG. 2 will be explained. In this drawing, the target average setup gain ($G_M$) at the maximum input intensity in the input dynamic range is calculated (Step S101). Thereafter, the gain of the optical amplifier is controlled to be set to $G_M$ calculated in the process at Step S101 (Step S102). In this state, the target average setup gain ($G_m$) at the minimum input intensity in the input dynamic range is calculated (Step S103). Further, the gain of the optical amplifier is controlled to be set to $G_M$ calculated in the process at Step S101 when the input intensity is at the maximum, and set to $G_m$ calculated in the process at Step S103 when the input intensity is at the minimum (Step S104). In this state, the target average setup gains $[G(P_{in})]$ are calculated for different input intensities in the input dynamic range (Step S105).

The process of calculating the target average setup gain ($G_M$) at the maximum input intensity described in FIG. 3 will be explained in detail. In this drawing, gains $G(\lambda_1, P_{in\_max})$, $G(\lambda_2, P_{in\_max})$, ..., $G(\lambda_n, P_{in\_max})$ are measured for specific wavelengths $\lambda_1, \lambda_2, \ldots, \lambda_n$ (where n is a positive integer), respectively, at the maximum input intensity of the input dynamic range within the amplification band of the optical amplifier (Step S201), the average of the gains $G(\lambda)$ for the entire wavelengths is calculated (Step S202), and the process returns to the flow described in FIG. 2.

In the process of calculating the target average setup gain ($G_m$) at the minimum input intensity described in FIG. 4, gains $G(\lambda_1, P_{in\_min})$, $G(\lambda_2, P_{in\_min})$, ..., $G(\lambda_n, P_{in\_min})$ are measured for specific wavelengths $\lambda_1, \lambda_2, \ldots, \lambda_n$ (where n is a positive integer), respectively, at the minimum input intensity of the input dynamic range within the amplification band of the optical amplifier (Step S301). Then, gain profile variations for different measurement wavelengths, namely differences between the gain at the maximum input intensity $G(\lambda_1, P_{in\_max})$ and the gain at the minimum intensity for the measurement wavelengths, $\Delta G_{\lambda 1} = G(\lambda_1, P_{in\_max}) - G(\lambda_1, P_{in\_min})$, $\Delta G_{\lambda 2} = G(\lambda_2, P_{in\_max}) - G(\lambda_2, P_{in\_min})$ . . . , $\Delta G_{\lambda n} = G(\lambda_n, P_{in\_max}) - G(\lambda_n, P_{in\_min})$, are calculated (Step S302). The maximum $\Delta G_{max}$ is selected from among $\Delta G_{\lambda 1}, \Delta G_{\lambda 2}, \ldots, \Delta G_{\lambda n}$ (Step S303), the target average setup gain ($G_m$) at the minimum input intensity is calculated on the calculation equation $G_m = G_M + G_{max}$ (Step S304), and the process returns to the flow of FIG. 2.

In the process of calculating the target average setup gain $G(P_{in})$ at different input intensities described in FIG. 5, the gains $G(\lambda_1, P_{in\_1})$, $G(\lambda_2, P_{in\_1})$, ... $G(\lambda_n, P_{in\_1})$ are measured for specific wavelengths $\lambda_1, \lambda_2, \ldots, \lambda_n$ (where n is a positive integer) at an input intensity within the dynamic range (Step S401). Then, gain profile variations for the individual measurement wavelengths, namely differences between the gain at the maximum input intensity $G(\lambda_1, P_{in\_max})$ and the gain at the intensity for the measurement wavelengths, $\Delta G_{\lambda 1, P1} = G(\lambda_1, P_{in\_max}) - G(\lambda_1, P_{in\_1})$, $\Delta G_{\lambda 2, P1} = G(\lambda_2, P_{in\_max}) - G(\lambda_2, P_{in\_1})$, ..., $\Delta G_{\lambda n, P1} = G(\lambda_n, P_{in\_max}) - G(\lambda_n, P_{in\_1})$, are calculated (Step S402). The minimum $\Delta G_{min}$ is selected from among $\Delta G_{\lambda 1, P1}, \Delta G_{\lambda 2, P1} \ldots, \Delta G_{\lambda n, P1}$ (Step S403), and $G(\lambda, P_{in})$, which determines the minimum value of $\Delta G_{\lambda, P}$, is selected as the target average setup gain $G(P_{in})$ at the intensity (Step S404). After the process at Step S404, whether the measurement is completed is determined (Step S405). If the measurement for another input intensity is to be performed (Step S405, Yes), the input intensity is set to another value (step S406) and the processes at Steps S401 to S405 are repeated. On the other hand, if there is no measurement to be performed for any other input intensity (Step S405, No), the process returns to the flow described in FIG. 2.

The target average setup gains generated for the different input intensities in the flows depicted in FIGS. 2 to 5 are stored as output gain profiles in the storage area provided in the constant gain control circuit 8, the gain-variation-level compensating circuit 9, or the like. This allows the above discussed constant gain control to be rapidly performed based on the light intensity information of the optical input.

Figure 6:
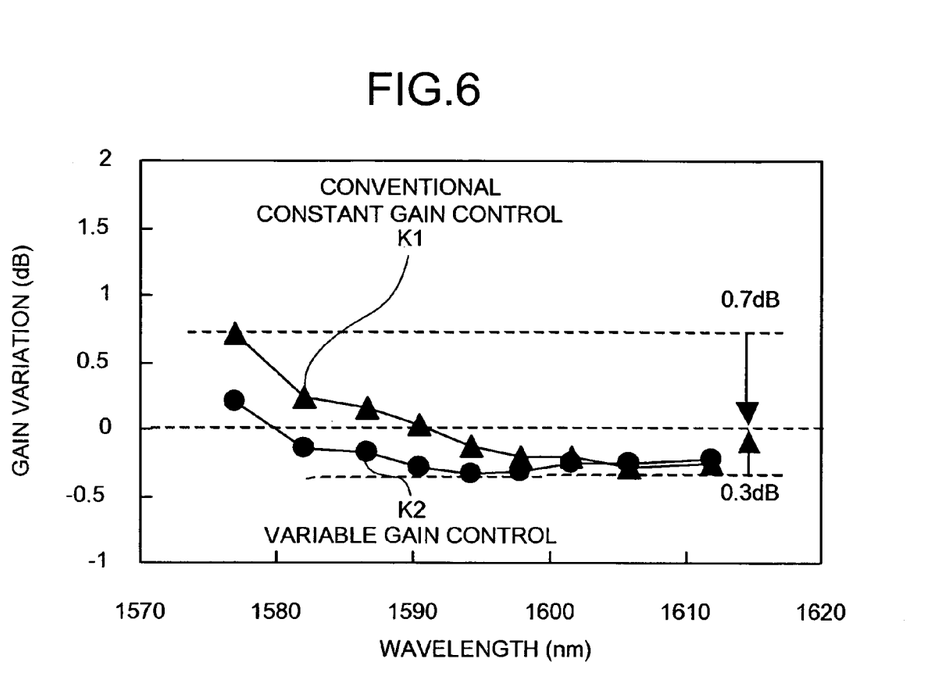
FIG. 6 is a diagram for comparing the output spectrum property of the optical amplifier according to the first embodiment with the conventional technology.

FIG. 6 is a diagram for comparing the output spectrum property of the optical amplifier according to the first embodiment with the conventional technology. The waveform K1 in this drawing represents the output property when a conventional constant gain control is conducted, while the waveform K2 represents the output property when the aforementioned control procedure executed by the gain-variation-level compensating circuit 9 is adopted. As shown in this drawing, a control error of approximately 0.7 decibel occurs with the conventional constant gain control. However, with the constant gain control according to the present embodiment, the control error is as small as approximately 0.3 decibel, which reveals that an excellent property of gain flatness is ensured in a wide input dynamic range.

As explained above, according to the present embodiment, the optical amplifier conducts a constant gain control for individual optical input signal intensities based on a compensation signal for compensating the spontaneous emission (ASE) component contained in the full output light monitor signal and the target average setup gain determined in accordance with the signal intensity of the input monitor signal. Thus, an optical amplifier and a method of controlling the gain thereof with an excellent property of a wide dynamic range can be realized.

It should be noted that, although the explanation has been given that forward pumping light is input from the pumping-light source 4 into the rare earth-doped fiber 1, the input pumping light is not limited to forward pumping light. The pumping method may be bidirectional or backward pumping as long as the conditions for allowing the output ASE intensity to be dealt as a constant within the dynamic range of the full input signal intensity are satisfied, as expressed in Equations (2).

Furthermore, the pumping-light source 4 may be constituted by a semiconductor laser comprising a wavelength stabilizing unit. In such a case, the wavelength of the pumping-light source injected into the rare earth-doped fiber 1 is stabilized, ensuring a still higher degree of gain evenness.

In general, glass host materials of the rare earth-dope fiber include silicon oxide, tellurite oxide, and bismuth oxide. The same effects as described above can be attained with such fibers.

In addition, the above described effects can be attained with optical amplifiers that correspond to different transmission bands, such as the L-band (1570 nanometers to 1610 nanometers), the extended L-band (1570 nanometers to 1620 nanometers), and the entire band (1530 nanometers to 1620 nanometers), in addition to the C-band (1530 nanometers to 1560 nanometers), which is the most commonly used transmission band of an optical communication system.

SECOND EMBODIMENT

Figure 7:
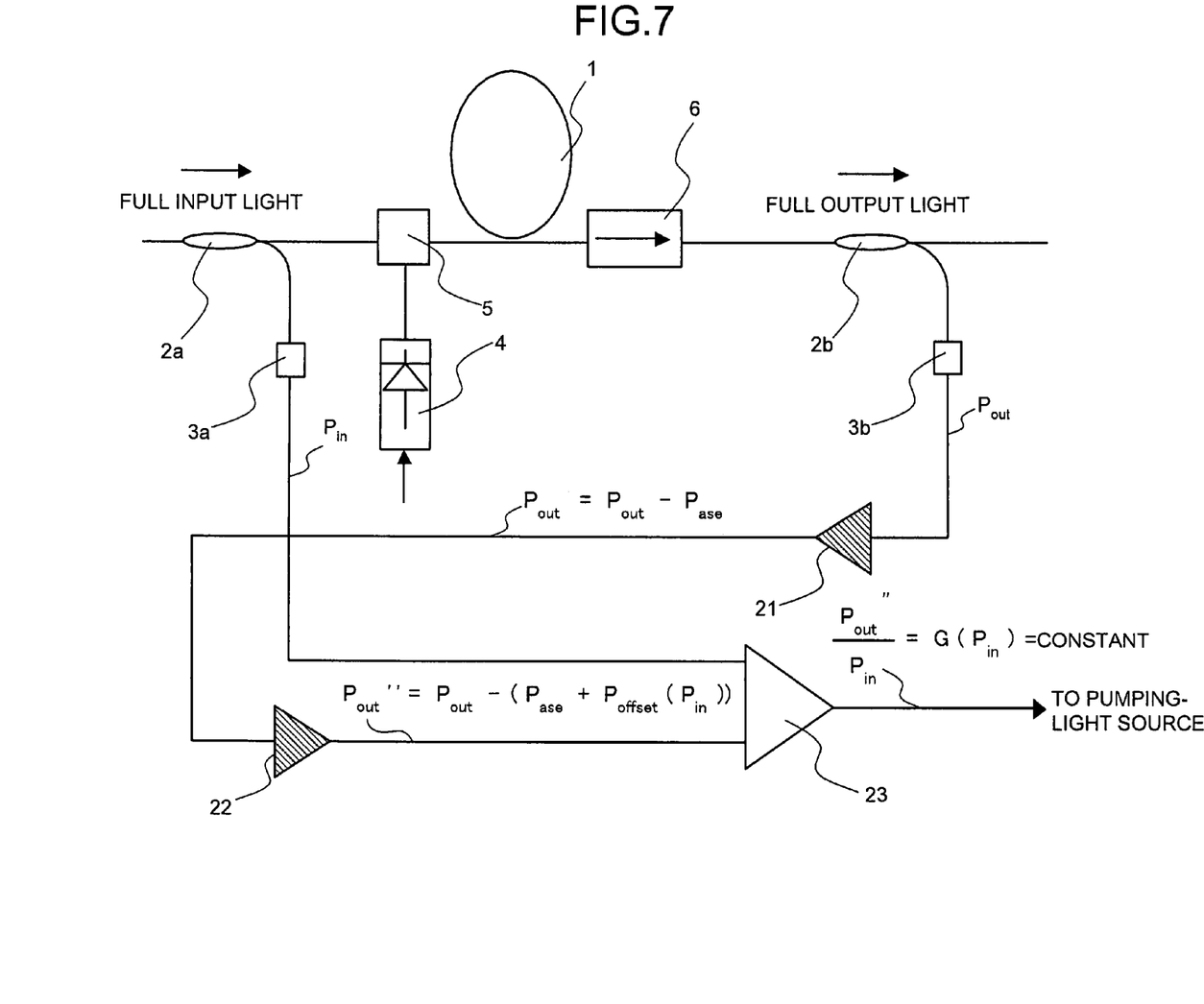
FIG. 7 is a diagram of the circuit structure of an optical amplifier according to a second embodiment of the present invention.

FIG. 7 is a diagram of the circuit structure of an optical amplifier according to a second embodiment of the present invention. In the first embodiment, a target average setup gain $G(P_{in})$ is supplied in accordance with the input signal level by the ASE compensating circuit 7, the constant gain control circuit 8, and the gain-variation-level compensating circuit 9, unlike the conventional stabilization control method. According to the second embodiment illustrated in FIG. 7, an ASE compensating circuit 21, a gain-variation-level compensating circuit 22, and a constant gain control circuit 23 are provided as structural units that easily realize these functions. The units identical or equivalent to the ones in FIG. 1 are denoted by the same numerals.

The operation of the optical amplifier illustrated in FIG. 7 will be explained. In this drawing, part of the input signal light that is input is diverged by the optical coupler 2a, the input signal light intensity of which is detected by the optical-level detecting unit 3a, and is converted to a full input light electrical signal having an electrical signal level $P_{in}$. The pumping light from the pumping-light source 4 is input into the rare earth-doped fiber 1 by the pumping-light source coupler 5, together with the input signal light, where the input signal light is amplified. Part of the amplified output signal light is diverged by the optical coupler 2b, the output signal light intensity of which is detected by the optical-level detecting unit 3b, and is converted to a full output light electrical signal having an electrical signal level $P_{out}$.

Further, the full input light electrical signal of the electrical signal level $P_{in}$ is input to the constant gain control circuit 23. Meanwhile, the full output light electrical signal of the electrical signal level $P_{out}$ is input to the ASE compensating circuit 21. The full output light electrical signal of the electrical signal level $P_{out}$ that is input to the ASE compensating circuit 21 is converted to satisfy $P_{out}'=P_{out}-P_{ase}$, where the ASE light electrical signal level $P_{ase}$ included in $P_{out}$ is subtracted. Thereafter, it is input into the gain-variation-level compensating circuit 22. The gain-variation-level compensating circuit 22 converts $P_{out}'$ to $P''_{out}=P_{out}-(P_{ase}+P_{offset}(P_{in}))$, which is then input into the constant gain control circuit 23. The constant gain control circuit 23 performs control to satisfy $P''_{out}/P_{in}=G(P_{in})=$constant.

At this stage, the target setup value of $P''_{out}/P_{in}$ is determined in accordance with the procedure explained in the first embodiment. The function of making the target average setup gain value variable in accordance with changes in the input intensity can be realized by varying the value of the electrical signal level $P_{offset}(P_{in})$ supplied by the gain-variation-level compensating circuit 22.

Moreover, the ASE compensating circuit 21 may be omitted from FIG. 7, and the conversion process of $P''_{out}=P_{out}-(P_{ase}+P_{offset}(P_{in}))$ may be simultaneously conducted by the gain-variation-level compensating circuit 22.

As explained above, with the optical amplifier according to the present embodiment, the gain control is conducted in such a manner that the ratio of a subtraction signal obtained by subtracting the offset component, which is determined on the basis of the signal intensity of the input monitor signal, from the ASE compensation signal, to the input monitor signal agrees with the target average setup gain determined on the basis of the signal intensity of the input monitor signal. Hence, the optical amplifier of the present embodiment has an effect, in addition of the effect of the first embodiment, that the gain controlling function of the optical amplifier can be constituted in a simple fashion.

THIRD EMBODIMENT

Figure 8:
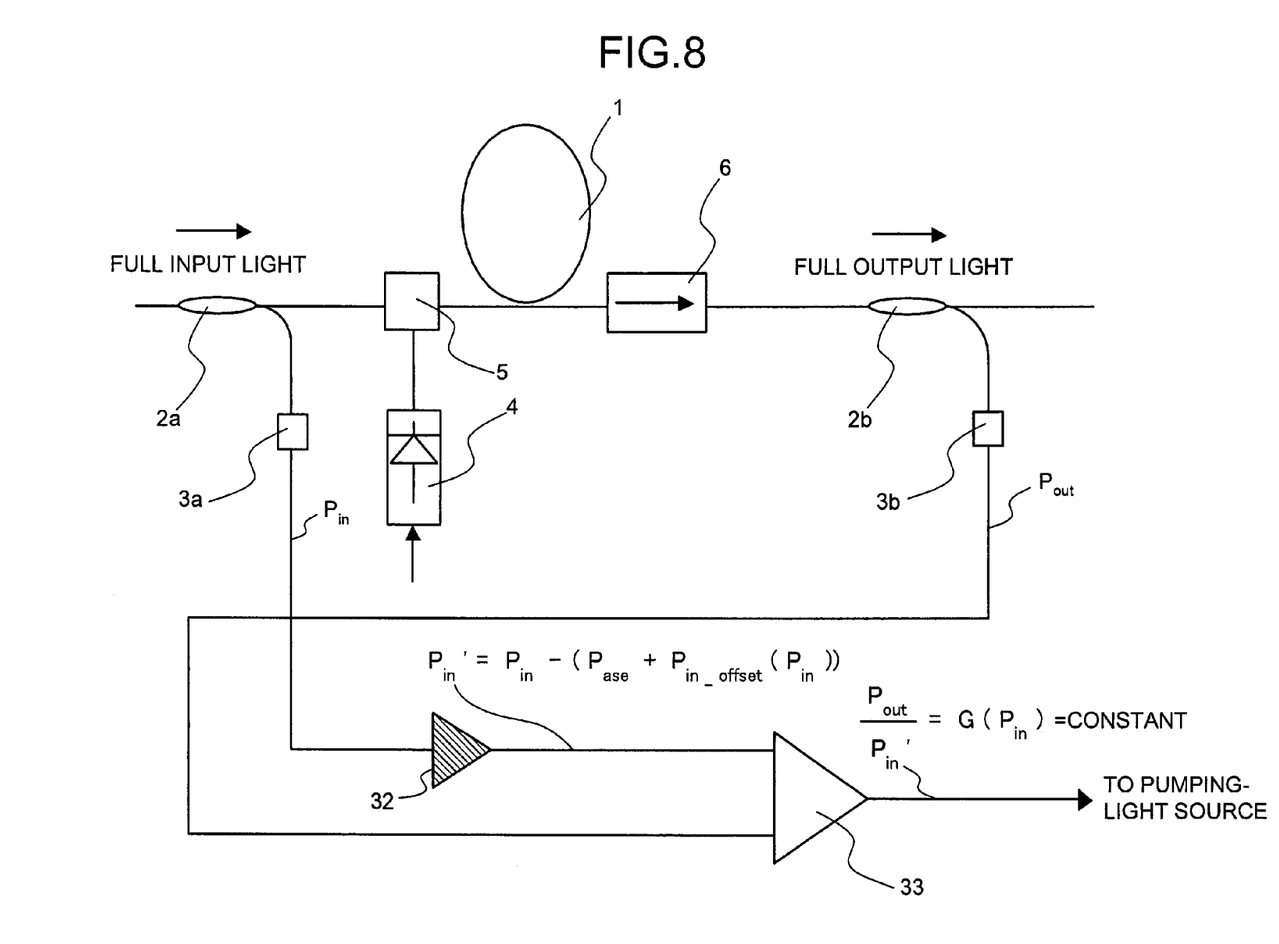
FIG. 8 is a diagram of the circuit structure of an optical amplifier according to a third embodiment of the present invention.

FIG. 8 is a diagram of the circuit structure of an optical amplifier according to a third embodiment of the present invention. According to the second embodiment, the variable gain control method is achieved by converting the output electrical signal level in accordance with $P''out=P_{out}-(P_{ase}+P_{offset}(P_{in}))$. According to the third embodiment illustrated in FIG. 8, an input-level converting circuit 32, which is provided with the functions of both the ASE compensating circuit and the gain-variation-level compensating circuit, and a constant gain control circuit 33 are arranged as structural units that realize the variable gain controlling function in a simple fashion, by performing conversion on the input electrical signal level. It should be noted that units identical or equivalent to the ones in FIG. 1 are denoted by the same numerals.

The operation of the optical amplifier illustrated in FIG. 8 will be explained. In this drawing, part of the input signal light that is input is diverged by the optical coupler 2a and converted to the full input light electrical signal of an electrical signal level $P_{in}$ by the optical-level detecting unit. The pumping light from the pumping-light source 4 is input into the rare earth-doped fiber 1 by the pumping-light source coupler 5, together with the input signal light, where the input signal light is amplified. Part of the amplified output signal light is diverged by the optical coupler 2b, the output signal light intensity of which is detected by the optical-level detecting unit 3b. Then, the output signal light is converted to a full output light electrical signal at an electrical signal level $P_{out}$.

The full input light electrical signal of the electrical signal level $P_{in}$ is input into the input-level converting circuit 32. The full input light electrical signal of the electrical signal level $P_{in}$ that is input into the input-level converting circuit 32 is converted to satisfy $P_{in}' = P_{in} + P_{ase} + P_{in\_offset}(P_{in})$ and then input into the constant gain control circuit 33. Meanwhile, the full output light electrical signal of an electrical signal level $P_{out}$ that is output from the optical-level detecting unit 3b is also input into the constant gain control circuit 33, and controlled by the constant gain control circuit 33 to satisfy $P_{out}/P_{in}' = G(P_{in}) =$ constant.

The target setup value of $P_{out}/P_{in}'$ is determined by following the procedure as explained in the first embodiment. The function of making the target average setup gain value variable in accordance with changes in the input intensity can be realized by varying the value of $P_{in\_offset}(P_{in})$.

As explained above, with the optical amplifier according to the present embodiment, a subtraction signal obtained by subtracting, from the input monitor signal, an ASE component contained in the output monitor signal and an offset component determined on the basis of the signal intensity of the input monitor signal is output, and the gain control is conducted in such a manner that the ratio of the output monitor signal to the subtraction signal agrees with the target average setup gain that is determined on the basis of the signal intensity of the input monitor signal. Thus, the optical amplifier of the present embodiment has an effect, in addition to the effect of the first embodiment, of realizing the variable gain control function in a simple fashion.

FOURTH EMBODIMENT

Figure 9:
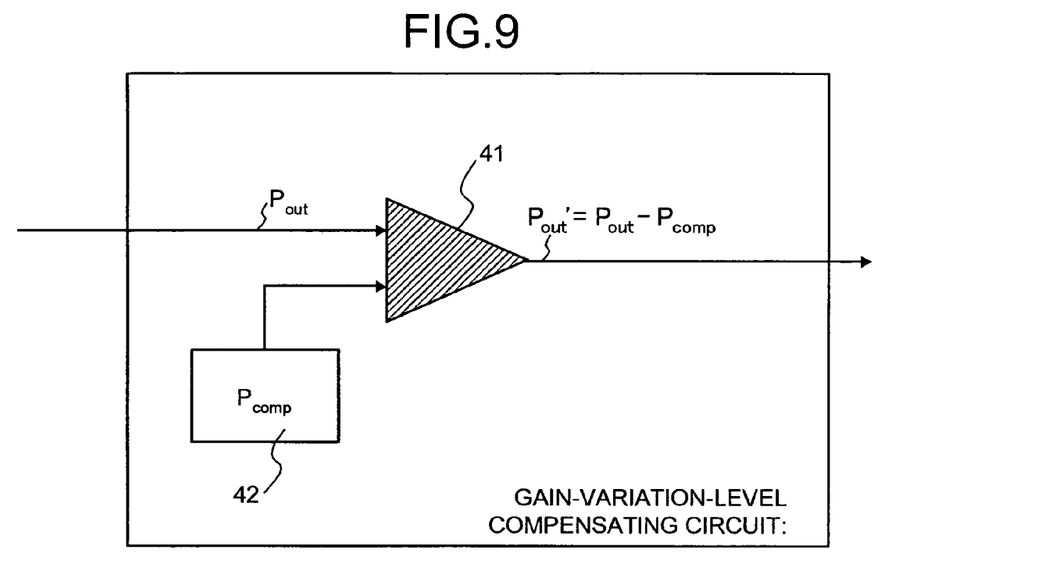
FIG. 9 is a diagram of the circuit structure of a gain-variation-level compensating circuit of an optical amplifier according to a fourth embodiment of the present invention.

FIG. 9 is a diagram of the circuit structure of a gain-variation-level compensating circuit of an optical amplifier according to a fourth embodiment of the present invention. The second and third embodiments show the structures in which different target average setup gains are determined in accordance with the input signal intensity. The gain-variation-level compensating circuit according to the fourth embodiment illustrated in FIG. 9 includes a subtracting unit 41 provided with two electrical signal input lines and a fixed-preset-level determining unit 42 as structural units that realize a simple and highly-accurate variable constant gain controlling function by adopting a fixed preset level for the gain-variation-level compensating circuit.

The operation of the optical amplifier illustrated in FIG. 9 will be explained. A full output light electrical signal of an electrical signal level $P_{out}$ that is output from the optical-level detecting unit 3b is input into a subtracting unit 41. Meanwhile, an electrical signal of a gain compensation level $P_{comp}$ that is predetermined as a constant and output from the fixed-preset-level determining unit 42 is also input into the subtracting unit 41 and converted by the subtracting unit 41 to an electrical signal of an output compensation level expressed as $P_{out}' = P_{out} - P_{comp}$, which is then output to the constant gain control circuit. Here, the $P_{comp}$ is determined to be the target average setup gain at the minimum input intensity within the input dynamic range, by following the procedure of setting the target average setup gain discussed in the first embodiment.

Figure 10:
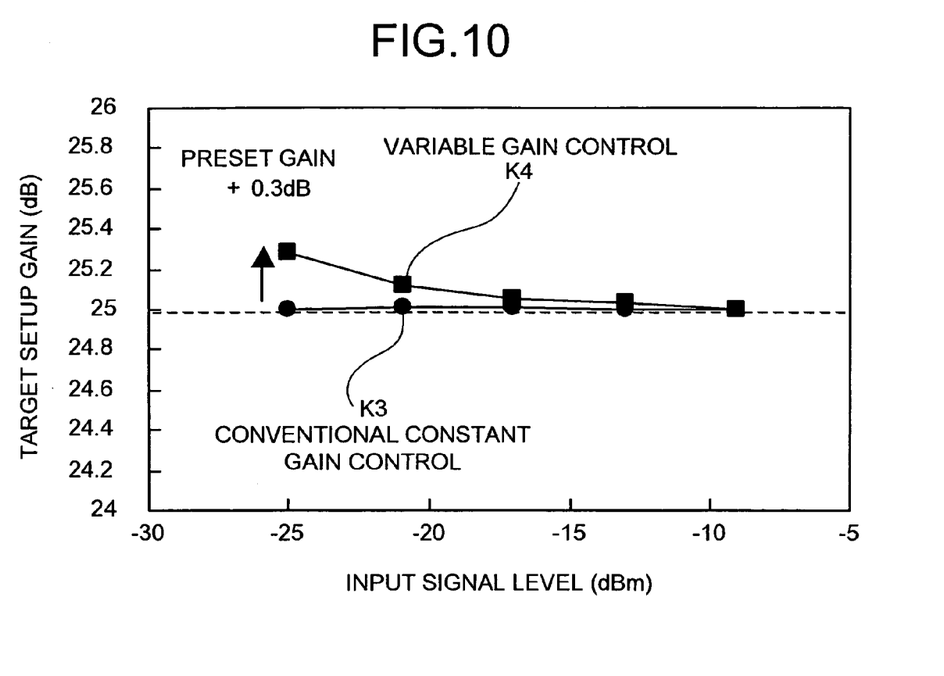
FIG. 10 is a diagram for comparing the output spectrum property of the optical amplifier according to the fourth embodiment with the conventional technology.

FIG. 10 is a diagram for comparing the output spectrum property of the optical amplifier according to the fourth embodiment with the conventional technology. In this drawing, the waveform K3 represents the output property when conducting the conventional constant gain control, while the waveform K4 represents the output property when adopting the above described controlling unit using a gain-variation-level compensating circuit. As shown in this drawing, because the compensation level $P_{comp}$ output from the fixed-preset-level determining unit 42 has a certain electrical level, its contribution decreases as the input signal level increases. Thus, the optimum target average setup gain in the input dynamic range can be offered simply by supplying a fixed electrical signal level. Because the gain-variation-level compensating circuit according to the present embodiment has a simple constitution that is sufficient to merely supply the fixed electrical signal level, it can be realized with a simple and inexpensive constitution such as a voltage divider that serves as a resistance if the subtracting unit is realized with a general operational amplifier, for example.

In the above structure, a method in which a certain fixed value is supplied in correspondence with the output level of the full output light electrical signal has been discussed as an example. It should be noted, however, that a method may be such that a certain fixed value is supplied in accordance with the output level of the full input light electrical signal. In such a case, a variable gain controlling function can also be realized in a simple manner with a structure similar to the present embodiment.

As explained above, with the optical amplifier according to the present embodiment, a gain compensation signal having an unchanged level is generated by the fixed-preset-level determining unit, and the gain compensation signal is subtracted from the output monitor signal to be output. This realizes a variable gain controlling function in a simple fashion.

FIFTH EMBODIMENT

Figure 11:
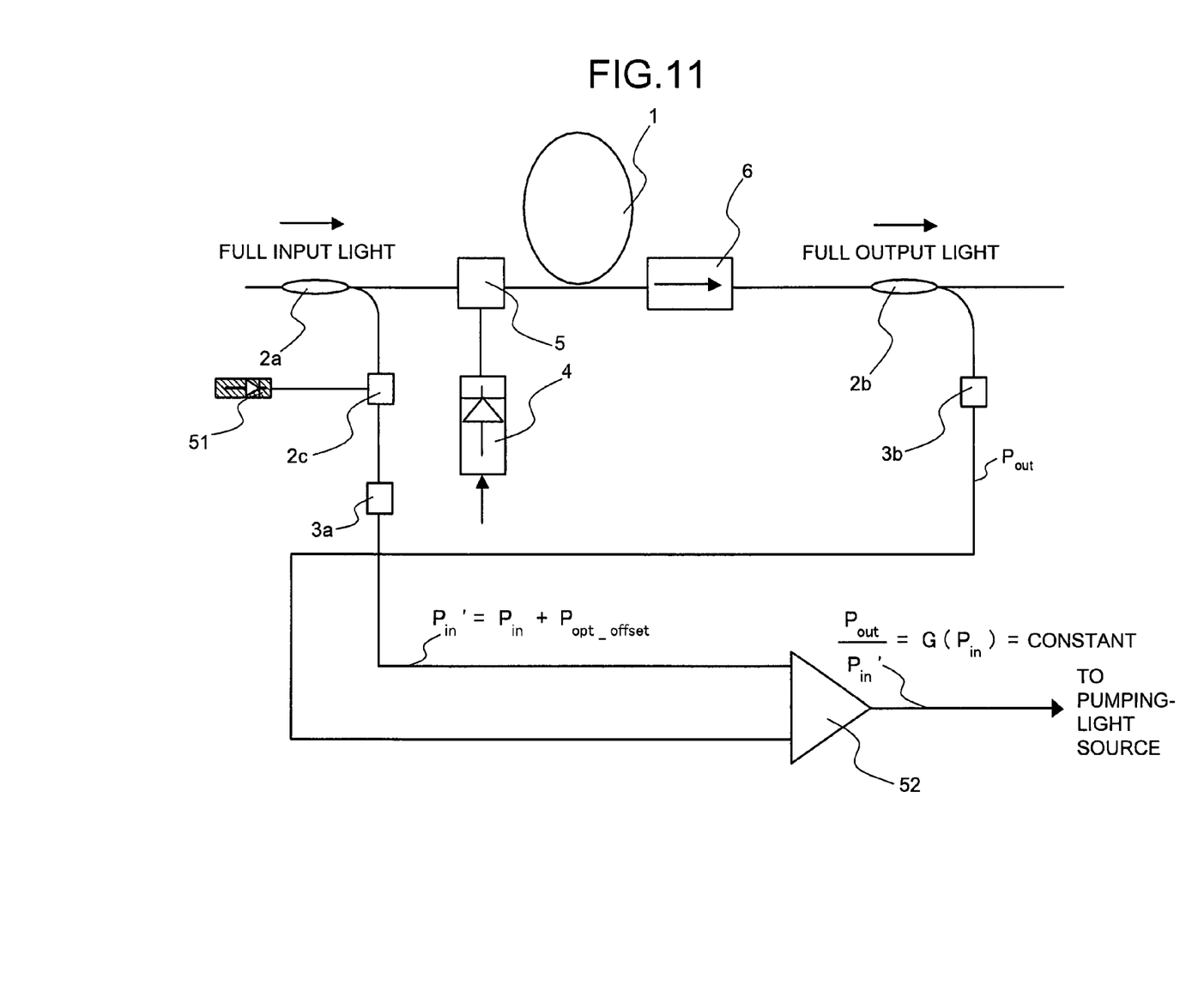
FIG. 11 is a diagram of the circuit structure of a gain-variation-level compensating circuit of an optical amplifier according to a fifth embodiment of the present invention.

FIG. 11 is a diagram of the circuit structure of a gain-variation-level compensating circuit of an optical amplifier according to a fifth embodiment of the present invention. In the first through fourth embodiments, the structure in which the target average setup gain value is varied by using an electrical signal has been discussed. According to the fifth embodiment illustrated in FIG. 11, an offset-light source 51, which is connected to an optical coupler 2c inserted between the optical coupler 2a and the optical-level detecting unit 3a, and a constant gain control circuit 52 are arranged as structural units that realize a simple and highly accurate variable constant gain controlling function by using optical levels for gain profile variation level compensation. It should be noted that units identical or equivalent to the ones in FIG. 1 are denoted by the same numerals.

The operation of the optical amplifier illustrated in FIG. 11 will be explained. In the drawing, part of the input signal light that is input is diverged by the optical coupler 2a and combined with the offset-light source 51 by the optical coupler 2c. Thereafter, the input signal light intensity is detected by the optical-level detecting unit 3a, and the input signal light is converted to satisfy $P_{in}+P_{opt\_offset}$, where the offset component of the offset-light source 51 is added to the full input light electrical signal of an electrical signal level $P_{in}$. Meanwhile, the pumping light sent from the pumping-light source 4 is input into the rare earth-doped fiber 1 together with the input signal light by the pumping-light source coupler 5, where the input signal light is amplified. Part of the amplified output signal light is diverged by the optical coupler 2b, the output signal light intensity of which is detected by the optical-level detecting unit 3b, and the output signal light is converted to a full output light electrical signal of an electrical signal level $P_{out}$.

Furthermore, the electrical signal of a signal level $P_{in}'=P_{in}+P_{opt\_offset}$ that is output by the optical-level detecting unit 3a and the full output light electrical signal of an electrical signal level $P_{out}$ are input into the constant gain control circuit 52. The $P_{in}'$ and $P_{out}$ that are input into the constant gain control circuit 52 are controlled in such a manner that the level ratio defined as $P_{out}/P_{in}'$ satisfies $P_{out}/P_{in}'=G(P_{in})=$constant.

The structure in which, through the above operation, the optical gain for a full input light signal level is varied in accordance with the input signal level can be achieved by varying the component $P_{opt\_offset}$, and the function of varying the target average setup gain value in accordance with the input intensity variation.

As explained above, with the optical amplifier according to the present embodiment, the gain is controlled in such a manner that the ratio of the output signal of the optical-level detecting unit and the output monitor signal agrees with the target average setup gain that is determined on the basis of the light intensity of the input monitor signal. Hence, the function of varying the target average setup gain value in accordance with the variation of the input intensity can be controlled in the light signal stage.

INDUSTRIAL APPLICABILITY

As described above, the optical amplifier according to the present invention can be applied to an optical amplification repeater of an optical communication system. It is especially suitable for an optical amplifier that is not dependent on types of rare earth-doped fibers used as an amplification medium.

The invention claimed is:

1. An optical amplifier employing a rare earth-doped fiber as an amplification medium, the optical amplifier comprising:
    an input monitoring unit that monitors full input light and outputs an input monitor signal;
    an output monitoring unit that monitors full output light and outputs an output monitor signal;
    an amplified-spontaneous-emission compensating circuit that compensates for an amplified-spontaneous-emission component contained in the output monitor signal;
    a gain-variation-level compensating circuit that calculates a target average setup gain that is determined based on a signal intensity of the input monitor signal; and
    a constant gain control circuit that performs a gain control based on an output signal from the amplified-spontaneous-emission compensating circuit and the target average setup gain.

2. The optical amplifier according to claim 1, wherein
    either one of the constant gain control circuit and the gain-variation-level compensating circuit includes a storage area, and
    an output gain profile used for the gain control is stored in the storage area.

3. The optical amplifier according to claim 2, wherein
    the output gain profile is generated based on the signal intensity of the input monitor signal for each signal intensity.

4. The optical amplifier according to claim 1, wherein
    the amplified-spontaneous-emission compensating circuit outputs an amplified-spontaneous-emission compensation signal obtained by subtracting the amplified-spontaneous-emission component contained in the output monitor signal from the output monitor signal,
    the gain-variation-level compensating circuit outputs a subtraction signal obtained by subtracting an offset component determined based on the signal intensity of the input monitor signal from the amplified-spontaneous-emission compensation signal, and
    the constant gain control circuit performs the gain control in such a manner that a ratio of the subtraction signal to the input monitor signal becomes identical to the target average setup gain determined based on the signal intensity of the input monitor signal.

5. The optical amplifier according to claim 4, wherein
    the gain-variation-level compensating circuit includes
        a compensation-level setting unit that generates a gain compensation signal of a constant level; and
        a subtracting unit that subtracts the gain compensation signal from the output monitor signal, and outputs a result of subtraction.

6. The optical amplifier according to claim 4, wherein
    the gain-variation-level compensating circuit includes
        a compensation-level setting unit that generates a gain compensation signal of a constant level; and
        a subtracting unit that subtracts the gain compensation signal from the input monitor signal and outputs a result of subtraction.

7. The optical amplifier according to claim 1, further comprising:
    a forward pumping-light source that injects a pumping light into the rare earth-doped fiber in a same direction as a direction of traveling of the full input light.

8. The optical amplifier according to claim 7, wherein
    the forward pumping-light source includes a semiconductor laser equipped with a wavelength stabilizing unit.

9. The optical amplifier according to claim 1, wherein
    a glass host material of the rare earth-doped fiber is any one of silicon oxide, tellurite oxide, and bismuth oxide.

10. An optical amplifier employing a rare earth-doped fiber as an amplification medium, the optical amplifier comprising:
    an input monitoring unit that monitors full input light and outputs an input monitor signal;
    an output monitoring unit that monitors full output light and outputs an output monitor signal;
    an input-level converting circuit that outputs
        a subtraction signal obtained by subtracting an amplified-spontaneous-emission component contained in the output monitor signal; and
        an offset component determined based on a signal intensity of the input monitor signal from the input monitor signal; and
    a constant gain control circuit that performs a gain control in such a manner that a ratio of the output monitor signal to the subtraction signal becomes identical to a target average setup gain determined based on the signal intensity of the input monitor signal.

11. An optical amplifier employing a rare earth-doped fiber as an amplification medium, the optical amplifier comprising:
   an input monitoring unit that monitors full input light and outputs an input monitor signal;
   an output monitoring unit that monitors full output light and outputs an output monitor signal;
   an optical-offset-signal output unit that outputs an optical offset signal;
   an optical coupler that combines the full input light and the optical offset signal; and
   an optical-level detecting unit that converts an output signal from the optical coupler into an electrical signal, wherein
   a gain control is performed in such a manner that a ratio of the output monitor signal to an output signal of the optical-level detecting unit becomes identical to a target average setup gain determined based on the signal intensity of the input monitor signal.

12. A method of controlling a gain of an optical amplifier that employs a rare earth-doped fiber as an amplification medium, the method comprising:
   first calculating including calculating a first target average setup gain at a maximum input intensity in an input dynamic range of an input light;
   first setting including setting the gain of the optical amplifier to the first target average setup gain;
   second calculating including calculating a second target average setup gain at a minimum input intensity in the input dynamic range of the input light;
   second setting including
      setting the gain of the optical amplifier to the first target average setup gain under a condition of the maximum input intensity; and
      setting the gain of the optical amplifier to the second target average setup gain under a condition of the minimum input intensity; and
   third calculating including calculating a third target average setup gain at each input intensity in the input dynamic rage of the input light.

* * * * *